(12) United States Patent
Li et al.

(10) Patent No.: US 7,071,492 B2
(45) Date of Patent: Jul. 4, 2006

(54) THERMO-OPTICAL DEVICE

(75) Inventors: Ruolin Li, Santa Clara, CA (US); Ut Tran, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/609,839

(22) Filed: Jun. 30, 2003

(65) Prior Publication Data

US 2004/0262616 A1 Dec. 30, 2004

(51) Int. Cl.
*H01L 27/15* (2006.01)
(52) U.S. Cl. .................. 257/84; 257/13; 257/22; 257/94; 257/103; 257/184; 257/432
(58) Field of Classification Search .................. 257/13, 257/22, 94, 103, 184, 972, 795
See application file for complete search history.

(56) References Cited

U.S. PATENT DOCUMENTS

| 5,117,470 A | * | 5/1992 | Inoue et al. ................... 385/14 |
| 5,994,679 A | * | 11/1999 | DeVeau et al. .............. 219/530 |
| 6,047,098 A | * | 4/2000 | Sagawa et al. .............. 385/141 |
| 6,741,769 B1 | * | 5/2004 | Laming et al. ................ 365/16 |

OTHER PUBLICATIONS

Handbook of Chemistry and Physics, David R. Lide, 82nd Edition 2001-2002, p. 12-97 and 12-226.*

* cited by examiner

*Primary Examiner*—Long Pham
*Assistant Examiner*—Wai-Sing Louie
(74) *Attorney, Agent, or Firm*—Trop, Pruner & Hu, P.C.

(57) ABSTRACT

A polymer well may be formed over a thermal oxide formed over a semiconductor substrate in one embodiment. The well may include a waveguide and a pair of heaters adjacent the waveguide. Each heater may be mounted on a platform of insulating material to reduce heat loss through the substrate and the thermal oxide, in one embodiment.

20 Claims, 3 Drawing Sheets

THERMO-OPTICAL DEVICE

BACKGROUND

This invention relates generally to thermo-optical devices.

A thermo-optical device is an optical device whose optical characteristics can be modified by heating. For example, the refractive index of a material may be selectively changed by heating. Examples of thermo-optic devices include tunable filters, lasers, variable optical amplifiers, and switches, to mention a few examples.

It is desirable that thermo-optic devices supply the least amount of power for heating the thermo-optic device to change its optical characteristics. Commonly, a waveguide is provided in a polymer filled region. The refractive index of the polymer filled region is changed by a heater. The tuning range is highly dependent on the effectiveness and efficiency of the heat delivered by the nearby heater.

Generally these schemes use a heater which is positioned over a polymer filled region. After long term thermal cycling, the heater may be subject to delamination due to the thermal mismatch between the polymer and the heater. The tuning range may also be unpredictable due to uncontrollable heat delivered to the polymer.

Thus, there is a need for other ways to provide thermo-optic devices.

DETAILED DESCRIPTION

Figure 1:
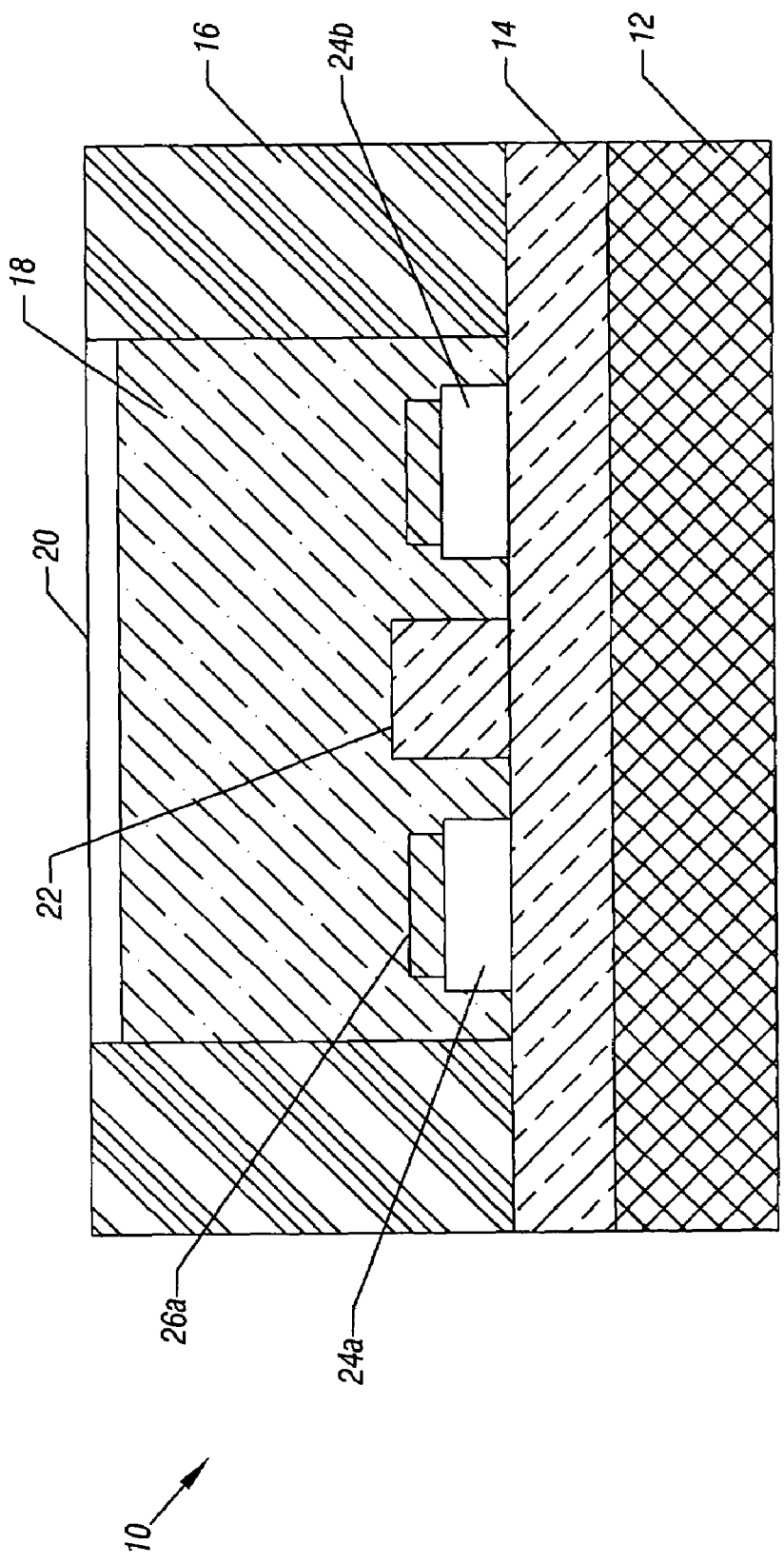
FIG. 1 is an enlarged, cross-sectional view of one embodiment of the present invention.

Referring to FIG. 1, a tunable thermo-optic device 10 may be any device whose optical characteristics are altered by heating. For example, some materials may change refractive index in response to heating. These materials may be used to form tunable filters, tunable lasers, variable optical amplifiers, and switches, to mention a few examples.

A silicon substrate 12 may be covered by a thermal oxide 14 in one embodiment. The thermal conductivity of the thermal oxide 14 may be very low to reduce heat transfer to the substrate 12. Above the thermal oxide 14 is an upper cladding 16. In one embodiment the cladding 16 may be borophosphosilicate glass (BPSG). The upper cladding 16 may have an aperture that is filled with a polymer well 18. Suitable polymers include high molecular weight polymers with covalent bonds that exhibit a high thermo-optic coefficient. An example of such polymers is deuterated poly (methylmethacrylate).

Also positioned within the polymer well 18 is a waveguide 22. A pair of heaters 26a and 26b may be positioned over insulator platforms 24a and 24b. In one embodiment, the insulator platforms 24a and 26b may be formed of polyimide. Polyimide is widely used as an ultraviolet sensitive photoresist and its optical characteristics change in response to heating.

The layer 20 may be used to protect the well 18. It may be formed of an insulating material in one embodiment.

Thus, the heat loss path from the heaters 26 to the relatively thermally conductive substrate 12 goes through the thermal oxide 14 and the insulator platforms 24a and 24b. In some cases, the thermal conductivity of the thermal oxide 14 is much higher than that of the polymer well 18. As a result, heat loss may be controlled. In addition, cross talk may be reduced and optical performance may be less affected by unwanted sources of heat.

Figure 2:
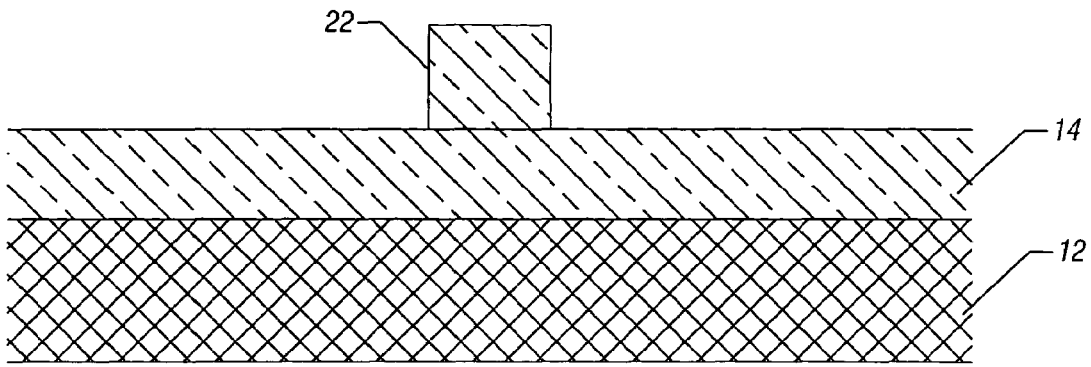
FIG. 2 is an enlarged, cross-sectional view of the embodiment shown in FIG. 1 in an early stage of manufacture in one embodiment of the present invention.
Figure 3:
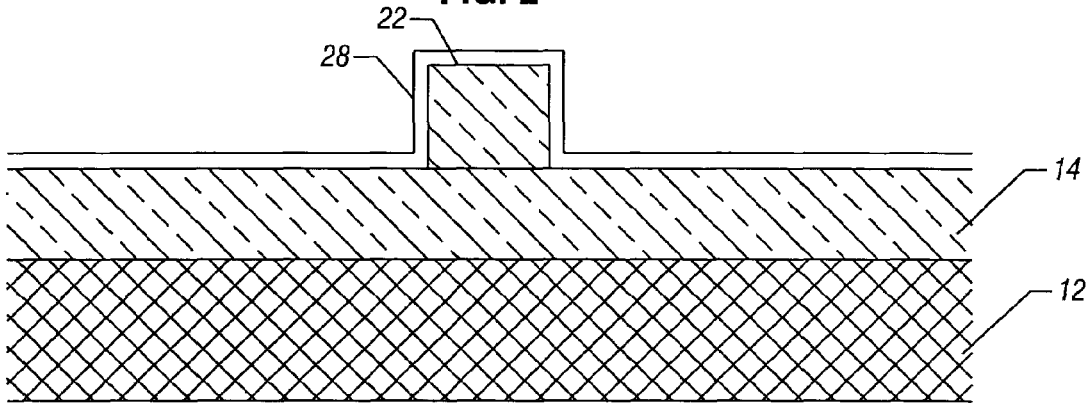
FIG. 3 is an enlarged, cross-sectional view of the embodiment shown in FIG. 2 at a subsequent stage of manufacture in one embodiment of the present invention.
Figure 4:
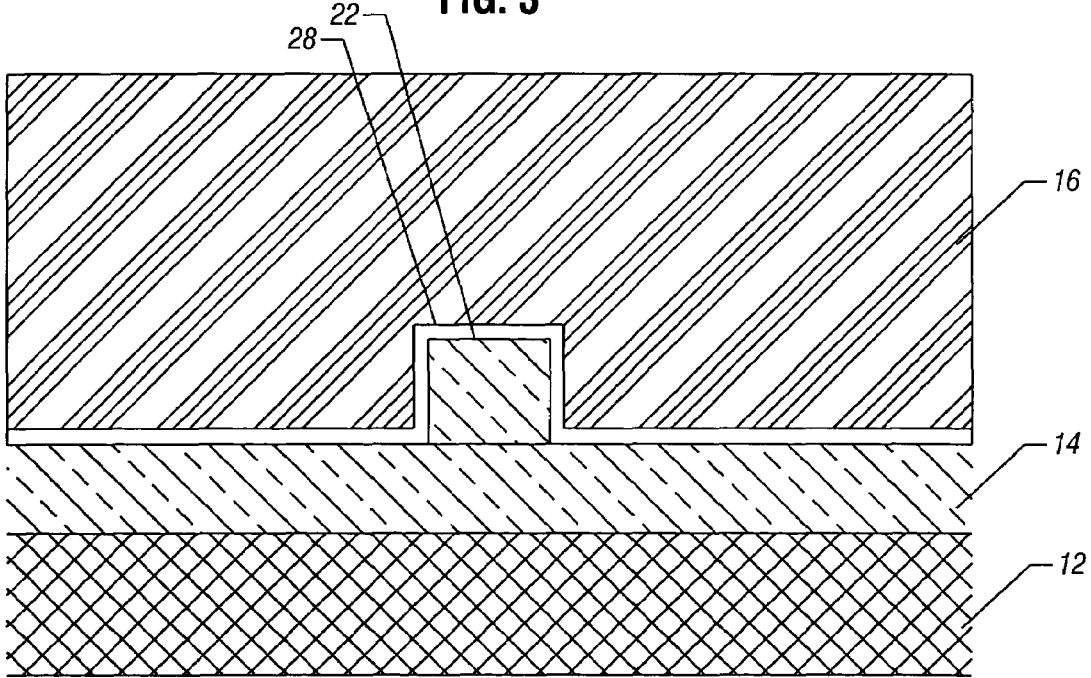
FIG. 4 is an enlarged, cross-sectional view of the embodiment shown in FIG. 3 at a subsequent stage of manufacture in accordance with one embodiment of the present invention.
Figure 5:
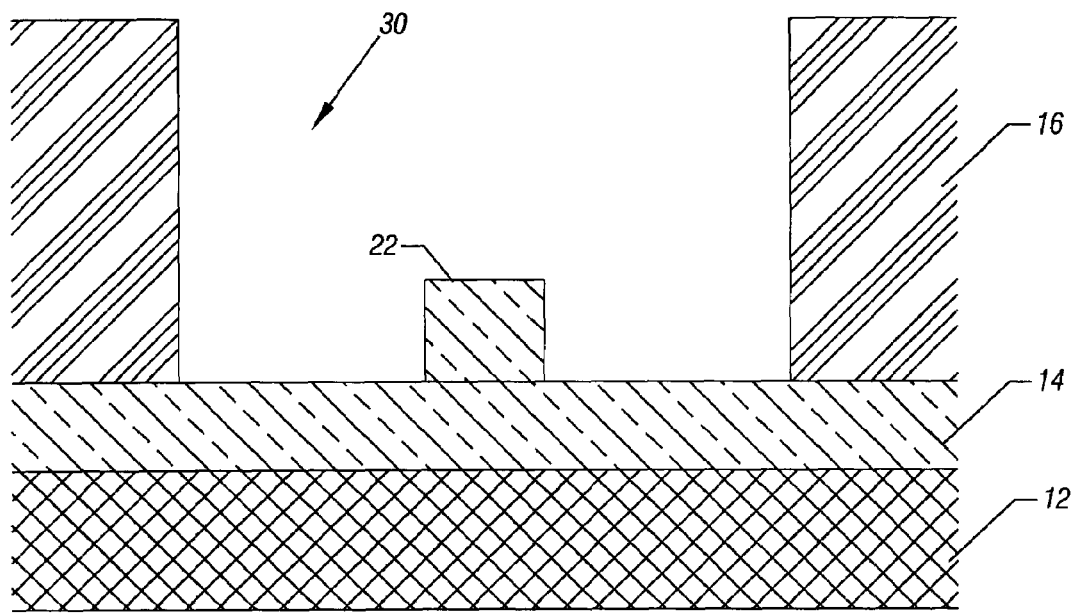
FIG. 5 is an enlarged, cross-sectional view of the embodiment shown in FIG. 4 at a subsequent stage of manufacture in accordance with one embodiment of the present invention.

In one embodiment, the waveguide 22 may be formed of germanium doped silicon, deposited patterned and etched, for example, by reactive ion etching (RIE) as shown in FIG. 2. An etch stop layer 28, such as a metal or dielectric, is formed as shown in FIG. 3. The waveguide 22 may be covered with a BPSG top cladding 16 in one embodiment shown in FIG. 4. The top cladding 16 may be RIE etched down to the etch stop layer 28 to form the polymer well 18, as shown in FIG. 5. The etch stop layer 28 may thereafter be removed.

Figure 6:
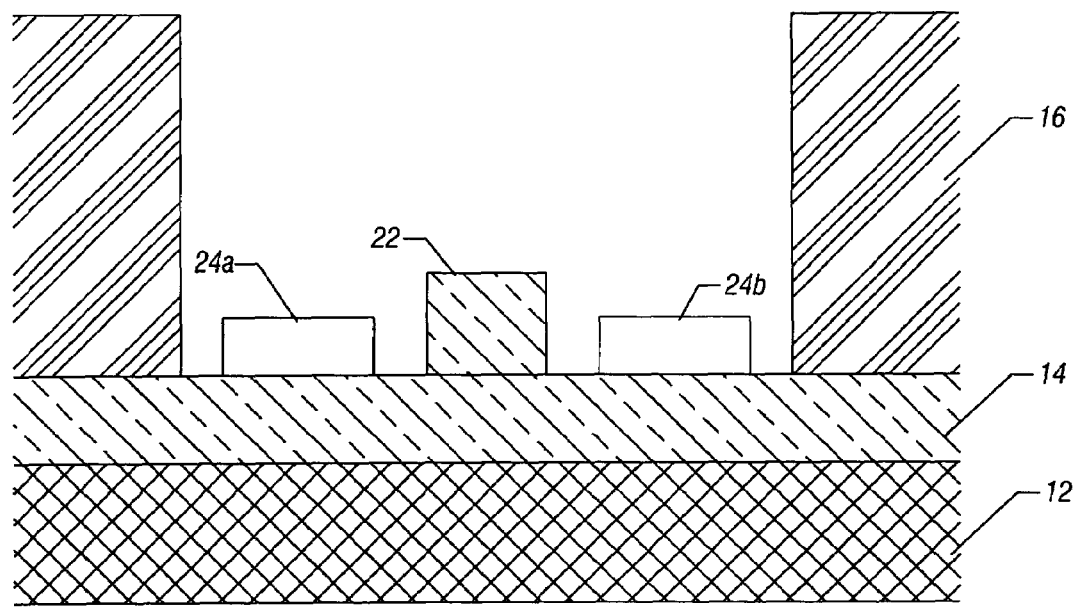
FIG. 6 is an enlarged, cross-sectional view of the embodiment shown in FIG. 5 at a subsequent stage of manufacture in accordance with one embodiment of the present invention.

Polyimide is coated, patterned, and cured at 300° C. to form the platforms 24 for the heaters 26 in one embodiment, shown in FIG. 6. Polyimide may have a thermal conductivity comparable to that of the polymer well 18 and is processable by patterning and hard bake curing. Thereafter, the heaters 26 may be formed to fabricate the structure shown in FIG. 1.

Through the use of the platforms 24 better heating efficiency may enable lower power tuning in some embodiments. Achieving lower power tuning may reduce cross-talk and improve performance.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A thermo-optic device comprising:
   a structure;
   a cladding over the structure;
   a polymer well formed in said cladding;
   a waveguide formed in said well;
   an insulating platform formed in said well on the structure; and
   a heater on said platform.

2. The device of claim 1 wherein said platform is made of a material that may be patterned.

3. The device of claim 2 wherein said platform is made of polyimide.

4. The device of claim 2 wherein said platform has lower heat conductivity than said structure.

5. The device of claim 4 wherein said structure includes an electrical insulator over a semiconductor substrate.

6. The device of claim 5 wherein said insulator is thermal oxide.

7. The device of claim 1 including a pair of platforms on opposed sides of said waveguide, a heater on each platform.

8. The device of claim 7 wherein said waveguide and said platform are formed directly on said structure.

9. The device of claim 1 wherein said polymer well to change its index of refraction in response to heating.

10. The device of claim 9 wherein said platform to change its refractive index in response to heating.

11. A thermo-optic device comprising:
a semiconductor substrate;
a waveguide on said substrate;
a thermally insulating platform on said substrate;
a heater formed on said platform; and
an insulating material over said heater.

12. The device of claim 11 wherein said platform is formed of a patternable material.

13. The device of claim 11 wherein said platform is formed of polyimide.

14. The device of claim 11 wherein said substrate includes a thermal insulator over a semiconductor.

15. The device of claim 11 wherein platform and said insulating material have substantially the same thermal conductivity.

16. The device of claim 11 wherein said platform and said insulating material have different compositions.

17. The device of claim 11 wherein said platform has a lower thermal conductivity than said substrate.

18. The device of claim 11 including a pair of platforms and a heater over each of said platforms.

19. The device of claim 11 including a cladding over said substrate and a well formed in said cladding, said well extending through said cladding to said substrate, said waveguide, heater, and platform located within said well.

20. The device of claim 19 wherein said material is a polymer that substantially fills said well.

* * * * *